United States Patent
Hiramatsu et al.

[11] Patent Number: 5,966,095
[45] Date of Patent: Oct. 12, 1999

[54] ADAPTIVE ARRAY ANTENNA RECEIVING APPARATUS

[75] Inventors: Katsuhiko Hiramatsu, Yokosuka; Hideyuki Takahashi, Hachiouji, both of Japan

[73] Assignee: Matsushita Electric Industrial Co., LTD, Osaka, Japan

[21] Appl. No.: 09/086,555

[22] Filed: May 29, 1998

[30] Foreign Application Priority Data

Jun. 6, 1997 [JP] Japan ..................... 9-164972

[51] Int. Cl.$^6$ .................................. G01S 13/16
[52] U.S. Cl. ........................... 342/383; 342/378
[58] Field of Search ..................... 342/378, 383

[56] References Cited

U.S. PATENT DOCUMENTS

| | | | |
|---|---|---|---|
| 4,780,721 | 10/1988 | Dobson | 342/178 |
| 5,218,359 | 6/1993 | Minamisono | 342/383 |
| 5,434,578 | 7/1995 | Stehlik | 342/383 |
| 5,608,409 | 3/1997 | Rilling | 342/380 |
| 5,854,612 | 12/1998 | Kamiya et al. | 342/383 |

FOREIGN PATENT DOCUMENTS

| | | |
|---|---|---|
| 60-91728 | 5/1985 | Japan . |
| 61-140226 | 6/1986 | Japan . |
| 63-240201 | 10/1988 | Japan . |

OTHER PUBLICATIONS

A Japanese Language abstract of JP 61–140336.
A Japanese Language abstract of JP 60–91728.
A Japanese Language abstract of JP 63–240201.

*Primary Examiner*—Mark Hellner
*Attorney, Agent, or Firm*—Greenblum & Bernstein, P.L.C.

[57] ABSTRACT

A complex multiplying section multiplies a receiving signal by a complex weighting factor of a weighting factor controlling section. The output is added by an adding circuit, and decoded by a decoding circuit so as to obtain a received signal. The weighting factor of the weighting factor controlling section is set using only the weighting factor calculated by a synchronous burst having a different unique word pattern. On one hand, it is assumed that an interference station having the same unique word pattern exists. Then, a decision feedback adaptive array antenna receiving circuit 400, which does not update the weighting factor using the unique word pattern, performs a signal reception. On the other hand, it is assumed that no interference station having the same unique word pattern exists. Then, the conventional decision feedback adaptive array antenna receiving circuit 500, which updates the weighting factor using the unique word pattern, performs a signal reception. Thereafter, a correct signal is selected from either one of the circuits. Thereby, the complex weighting factor of the adaptive array antenna is appropriately updated, so that a received signal can be extracted from the desired signal.

13 Claims, 14 Drawing Sheets

ADAPTIVE ARRAY ANTENNA RECEIVING APPARATUS

BACKGROUND OF THE INVENTION

1. Field of the Invention

The present invention relates to an adaptive array antenna receiving apparatus.

2. Description of the Related Art

FIG. 13 is a block diagram showing a conventional adaptive array antenna receiving apparatus. The adaptive array antenna receiving apparatus receives carrier frequency signals from antennas a, b, and c. Then, receiving RF sections 1301, 1302, and 1303 down convert these carrier frequency signals to intermediate frequency signals, thereafter demodulate into base band signals which are in-phase component (I-ch), and an orthogonal component(Q-ch), respectively. A/D converters 1304 to 1309 convert the base band signals to digital signals, respectively.

Complex multiplying circuits 1310,1311, and 1312 carry out a complex multiplication of outputs signals of the A/D converters 1304 to 1309 in accordance with an output of a weighting factor controlling circuit 1313, respectively and the multiplication results are added by an adding circuit 1314. Thus the adaptive array antenna reception is carried out by above procedure. Then, a decoding circuit 1315 decodes the received signal.

The weighting factor of the weighting factor controlling circuit 1313 is updated using a unique word when a synchronous burst is received. At a unique word receiving interval, a switch SWa 1316 is closed and the signals digitized by the A/D converters 1304 to 1309 are transferred to the weighting factor controlling circuit 1313.

Resultant signals received by the adaptive array antenna, serving as added outputs, are transferred to a differential circuit 1318 when a switch SWb 1317 is closed. The unique word for synchronous burst is transferred to a modulating circuit 1320 when a switch SWc 1319 is closed.

The modulating circuit 1320 modulates a unique word pattern of the synchronous burst. The differential circuit 1318 subtracts a signal, which is obtained by modulating the unique word pattern, from the resultant signals received by the adaptive array antenna, thereby calculating an error between these signals.

The weighting factor controlling circuit 1313 calculates a new weighting factor based on the error signal, the received signal from each antenna, and the weighting factor previously sampled, updating the weighting factor of the weighting factor controlling circuit 1313.

In the adaptive array antenna receiving apparatus of this figure, the switch SWc 1319 is connected to the unique word side at the unique word receiving interval, and connected to a decoding result of a message at a message-receiving interval. By such an operation, this receiving apparatus updates the weighting factor using both the unique word and message intervals.

In order to obtain more proper the weighting factor, there is a decision feedback typed adaptive array antenna receiving apparatus which feeds back the output of the decoder shown in FIG. 13 to the modulator.

FIG. 14 is a block diagram showing such a conventional decision feedback typed adaptive array antenna receiving apparatus. In this decision feedback typed adaptive array antenna receiving apparatus of this figure, a switch SWc 1419 is connected to the unique word side at the unique word receiving interval, and connected to the decoding result of the message at the message-receiving interval. By such an operation, the receiving apparatus updates the weighting factor using both the unique word and message intervals.

In this apparatus, a known symbol sequence such as a unique word is used as a reference signal, thereby updating the weighting factor, while the decision feedback of a decode signal Sfb of a message is performed and the signal is used as a reference signal, updating the weighting factor.

In a normal case, since the message portion is not the known symbol sequence, such a portion is not used as a reference signal. However, in a case that an error rate of the message portion is about $10^{-2}$, the number of errors in one slot is small. As a result, the decided symbol is regarded as substantially a correct symbol, and the signal of the message portion is used as a reference symbol.

Thus, in the conventional decision feedback typed adaptive array antenna receiving apparatus, the weighting factor of the weighting factor controlling circuit 1313 was updated by use of the unique word, thereafter the weighting factor was updated by use of the message portion as an auxiliary way.

In these conventional adaptive array antenna receiving systems, however, a discrimination between a desired station and an interference station cannot be made when the unique word of the desired station and that of the interference station are the same. As a result, a wave directivity, which should be directed to the desired station as shown in FIG. 15, will be directed to both the desired station and the interference station as shown in FIG. 16. In other words, the adaptive array antenna has the technique in which the desired station and the interference station are separated by directivity. However, in the above case, the unique word cannot be correctly received from the desired station because of the interference caused by receiving the waves of the desired station and the interference station simultaneously.

An object of the present invention is to provide an adaptive array antenna receiving apparatus, which can extract a signal of a desired station from receiving signals even if there is an interference station having the same known signal pattern as that of the desired station.

SUMMARY OF THE INVENTION

In order to achieve the above object, the present invention is to provide an adaptive array antenna receiving apparatus comprising: complex multiplying means for multiplying a receiving signal by a complex weighting factor; adding means for adding an output signal of the complex multiplying means; modulating means for modulating a known symbol; differential outputting means for calculating a difference between the output of the adding means and that of the modulating means; and weighting factor calculating means for calculating a complex weighting factor from the receiving signal and the output of the differential output means only when a known signal pattern of a desired station is different from that of an interference station.

According to the above structure, the adaptive array antenna reception can be performed using a weighting factor calculated by a synchronous burst having a different known signal pattern even if there is the interference station having the same known signal pattern as that of the desired station. Thereby, a signal of a desired station can be extracted from receiving signals.

DETAILED DESCRIPTION OF THE PREFERRED EMBODIMENTS

Embodiments of the present invention will now be specifically explained with reference to the drawings.
(First Embodiment)

Figure 1:
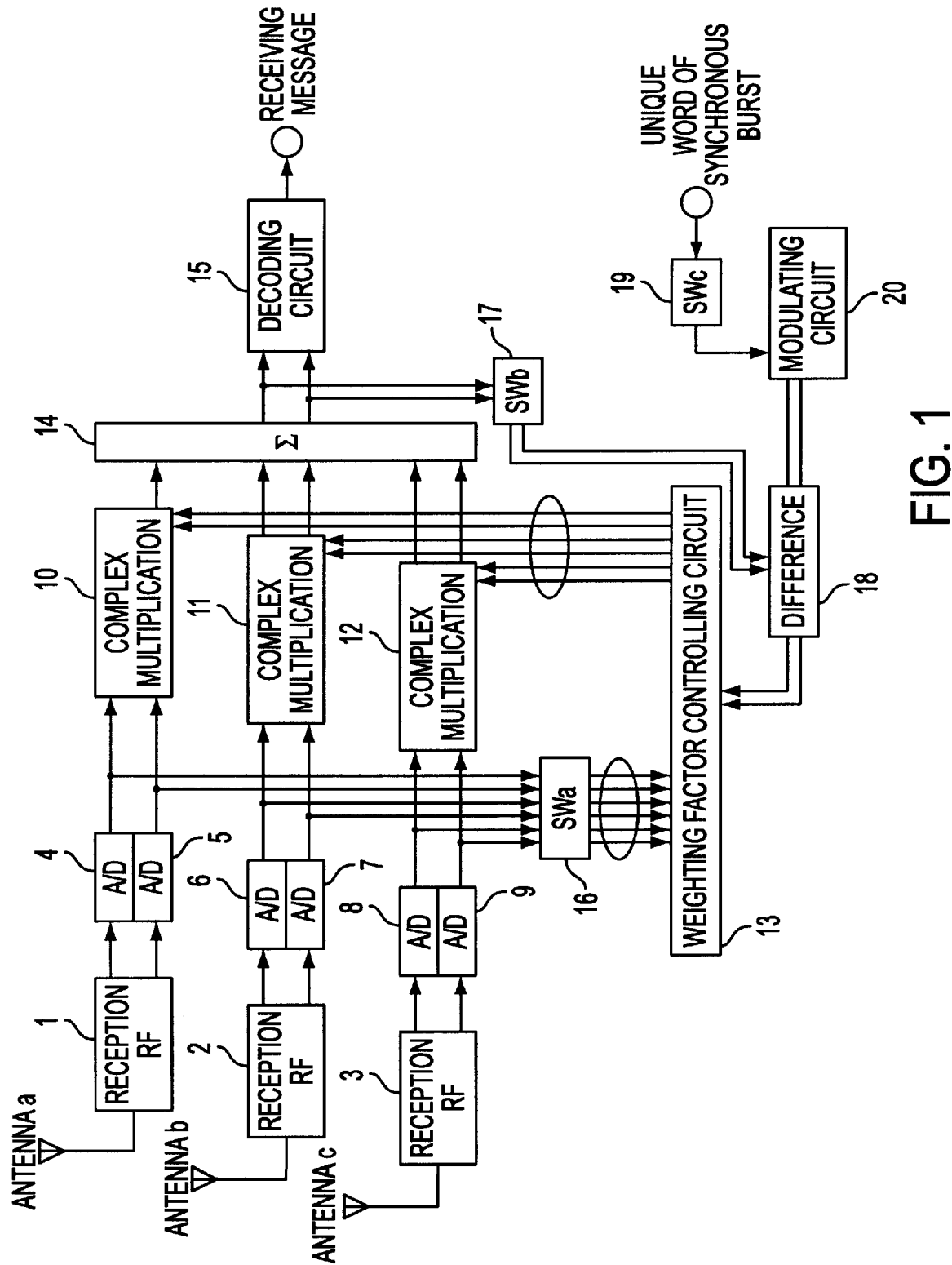
FIG. 1 is a block diagram showing an adaptive array antenna receiving apparatus according to a first embodiment of the present invention.
Figure 2:
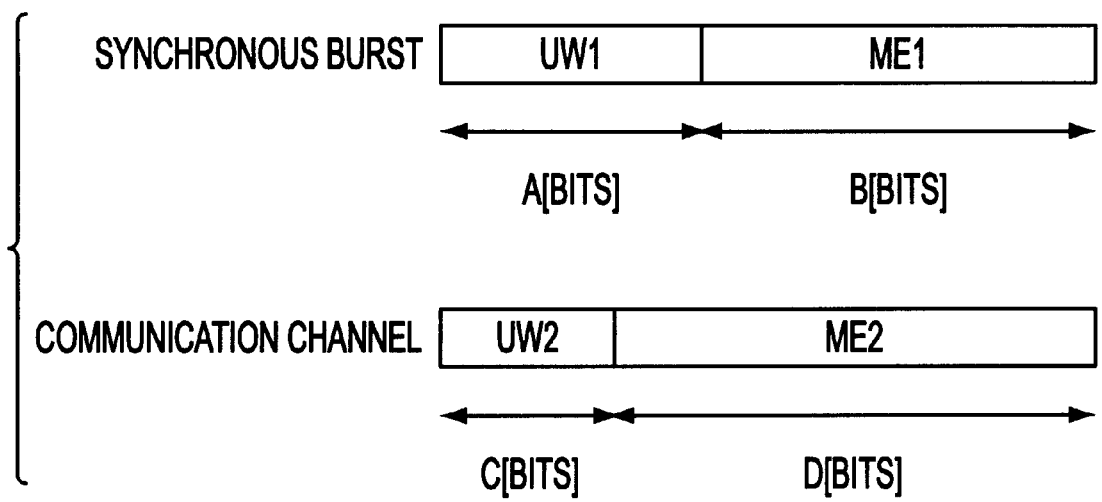
FIG. 2 is a view showing a frame format of receiving and transmitting signals according to the first embodiment of the present invention.
Figure 3:
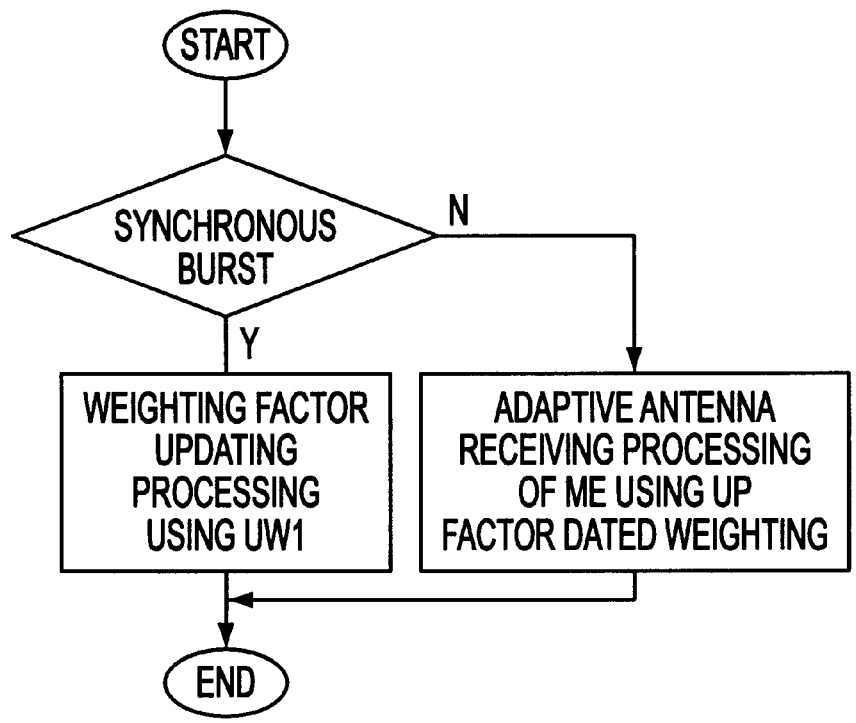
FIG. 3 is a flow chart showing an update of a weighting factor of a weighting factor controlling circuit according to the first embodiment of the present invention.

FIG. 1 is a block diagram showing an adaptive array antenna receiving apparatus of a first embodiment of the present invention. To simplify the explanation, the following will explain a case in which three antennas are used. However, even if the number of antennas is M, the basic operation is the same as the case in which three antennas are used. FIG. 2 shows a frame format of receiving and transmitting signals, and FIG. 3 is a flow chart showing an update of a weighting factor of a weighting factor controlling circuit.

The first embodiment will explain the following case:

More specifically, the adaptive array antenna receiving apparatus receives a burst (hereinafter referred to as a synchronous burst) having a different unique word pattern transmitted from a transmitting apparatus at the start of communication, thereafter receiving a burst (hereinafter referred to as a communication channel) for transmitting a message.

The adaptive array antenna receiving apparatus brings the weighting factors into convergence using the synchronous burst once received. Thereafter, the adaptive array antenna receiving apparatus does not update the weighting factor at the unique word receiving interval at the communication channel. That is, the adaptive array antenna receiving apparatus performs a directivity reception using the weighting factor, which is brought into convergence at the first synchronous burst reception, as it is. As a result, a transmitting signal can be correctly received from the desired station even if there are a plurality of desired stations and that of the interference stations in which their unique word patterns are the same.

The following will explain a receiving state of a portion, which does not depend on the kind of the burst to be received, with reference to FIG. 1:

The adaptive array antenna receiving apparatus receives signals from antennas a, b, and c. Then, receiving RF sections 1, 2, and 3 convert these carrier frequency signals from the respective antennas to base band signals, thereafter separating each base signal into an in-phase component as I-ch, and an orthogonal component as Q-ch, respectively. A/D converters 4 to 9 convert the base band signals to digital signals, respectively.

Each of complex multiplying circuits 10, 11, and 12 carries out a complex multiplication between a weighting factor output from a weighting factor controlling circuit 13 and an output of each of the A/D converters 4 to 9. The multiplication results are added by an adding circuit 14, and received by the adaptive array antenna. Then, a decoding circuit 15 decodes the received signal.

As shown in the flow chart of FIG. 3, the weighting factor of the weighting factor controlling circuit 13 is updated using a unique word that is included in its slot at a synchronous burst receiving time.

At a unique word receiving time (interval), a switch SWa 16 is closed and the signals digitized by the A/D converters 4 to 9 are transferred to the weighting factor controlling circuit 13.

Resultant signals received by the adaptive array antenna, serving as added outputs, are transferred to a differential circuit 18 when a switch SWb 17 is closed. The unique word of the synchronous burst is transferred to a modulating circuit 20 when a switch SWc 19 is closed.

The modulating circuit 20 modulates a unique word pattern of the received synchronous burst. The differential circuit 18 calculates an error signal between the modulation signal and the resultant signal received by the adaptive array antenna.

The weighting factor controlling circuit 13 calculates a new weighting factor based on the error signal, the received signal from each antenna, and the weighting factor previously sampled, updating the weighting factor of the weighting factor controlling circuit 13.

Since switches SWa 16, SWb 17, and SWc 18 are opened at the time other than the unique word receiving time, neither the modulating circuit 20, the differential circuit 18, nor the weighting factor controlling circuit 13 operates. Therefore, the weighting factor of the weighting factor controlling circuit 13 is not updated, and the weighting factor calculated using the unique word of the previous synchronous burst is directly set in the complex multiplying circuits 11, 12, and 13. These circuits 11, 12, and 13 operate based on the weight factor calculated using the unique word of the previous synchronous burst, the adaptive array antenna reception is performed by the adding circuit 14, and the adaptive array antenna reception result is decoded by the decoding circuit 15.

Similarly, at the communication channel receiving time, the weighting factor is not updated using the unique word as shown in the flow chart of FIG. 3. More specifically, SWa 16, SWb 17, and SWc 19 are opened, and neither the modulating circuit 20, the differential circuit 18, nor the weighting factor controlling circuit 13 operates. Therefore, the weighting factor calculated using the unique word of the previous synchronous burst is directly set in the complex multiplying circuits 11, 12, and 13. By use of the above-set weighting factor, the circuits 11, 12, 13 and the adding circuit 14 perform the adaptive array antenna reception, and the decoding circuit 15 decodes the adaptive array antenna reception result.

Thus, the adaptive array antenna receiving apparatus of the first embodiment can perform the adaptive array antenna reception using only the weighting factor calculated based on the synchronous burst having a different unique word pattern. As a result, only the received signal can be extracted from the desired station even if there exits the interference station having the same unique word pattern.

(Second Embodiment)

Figure 4:
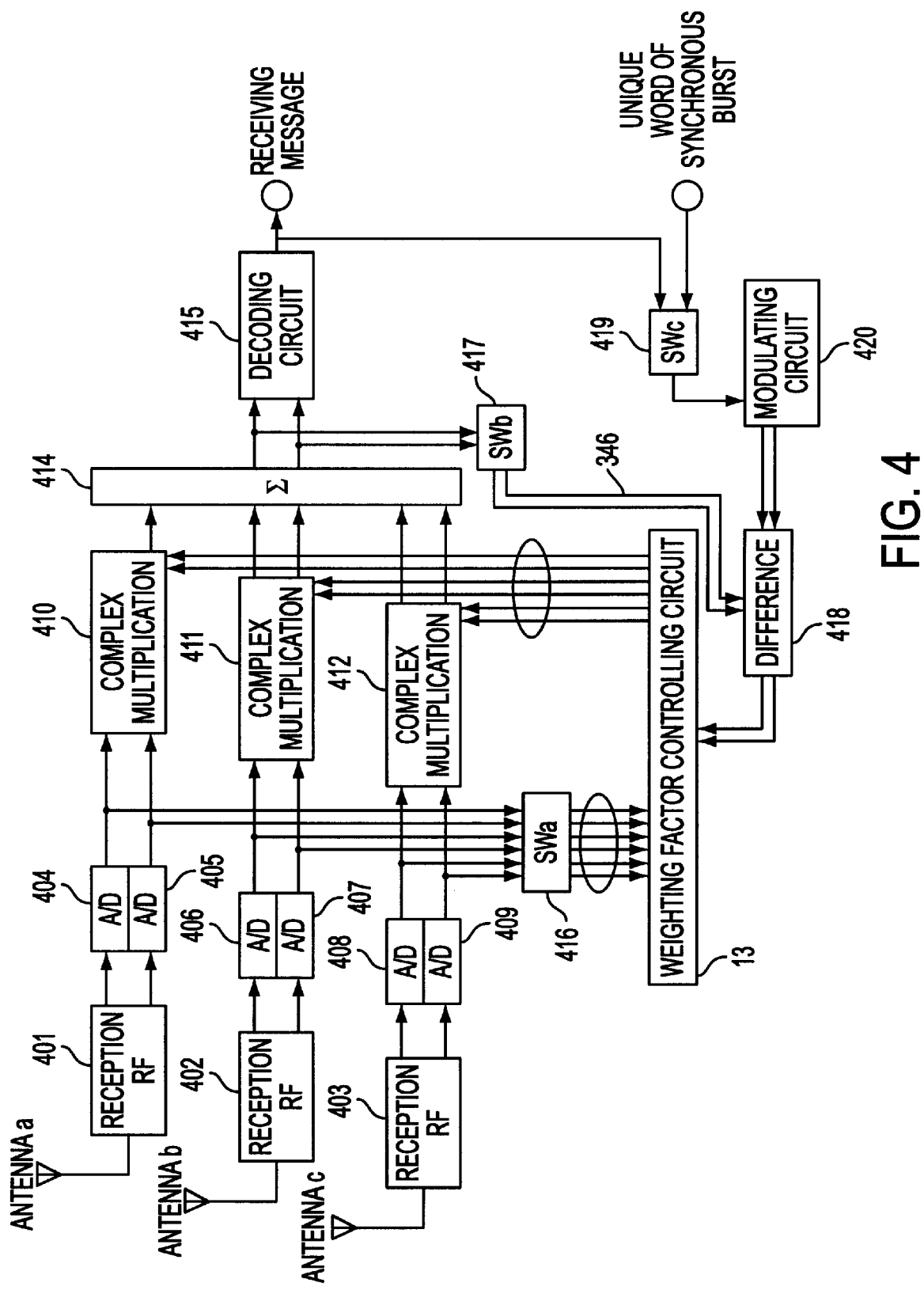
FIG. 4 is a block diagram showing an adaptive array antenna receiving apparatus according to a second embodiment of the present invention.

FIG. 4 is a block diagram showing an adaptive array antenna receiving apparatus according to a second embodiment of the present invention.

In the first embodiment, the update of the weighting factor using the unique word was not performed at the time other than the synchronous burst receiving time when the discrimination between the desired station and the interference station could not be made since the common unique word was used.

However, the use of a fixed weighting factor, which is calculated at the synchronous burst receiving time, may cause an improper reception because of the change in the propagation environment and the movement of the desired station.

According to the second embodiment, the unique word portion of the communication channel is set not to be transferred to a weighting factor controlling circuit 413 by a switch SWa 416. Instead, only the message portion of the communication channel is transferred to the circuit 413.

Moreover, the decoding result of the unique word portion of the communication channel is set not be used as a reference signal by a switch SWa 417, while the decoding result of the message portion is used as a reference signal. Thus, the method using the decoding result of the message portion as a reference signal is called as a decision feedback processing.

The adaptive array antenna receiving apparatus of FIG. 4 is the same as that of the first embodiment in the process in which the received signals are frequency-converted by receiving RF sections 401, 402, 403 and converted to digital signals by A/D converters 404 to 409.

In the second embodiment, however, at the unique word receiving time in receiving the synchronous burst, when the switch SWa 416 is closed, the signals digitized by the A/D converters 404 to 409 are transferred to the weighting factor controlling circuit 413. Complex multiplying circuits 411, 412, 413 and an adding circuit 414 perform the adaptive array antenna reception by use of the weighting factor of the weighting factor controlling circuit 413. Then, a decoding circuit 415 decodes the adaptive array antenna reception result.

When the switch SWb 417 is closed, the adaptive array antenna reception result is transferred to a differential circuit 418. When the switch SWc 419 is connected to the unique word side of the synchronous burst, the unique word of the synchronous burst is transferred to a modulating circuit 420. The modulating circuit 420 modulates the unique word pattern of the synchronous burst. A differential circuit 418 subtracts the modulated result of the unique word pattern from the adaptive array antenna reception results, calculating an error between these results.

The weighting factor controlling circuit 413 calculates a new weighting factor based on the error signal, the received signal from each antenna, and the weighting factor previously sampled, updating the weighting factor of the weighting factor controlling circuit 413.

At the time other than the unique word receiving time in receiving the synchronous burst, the switch SWa 416 is closed, and the signals digitized by the A/D converters 404 to 409 are transferred to the weighting factor controlling circuit 413. By use of the weighting factor, the complex multiplying circuits 410, 411, 412 and the adding circuit 414 perform the adaptive array antenna reception. Then, the decoding circuit 415 decodes the adaptive array antenna reception result.

When the switch SWb 417 is closed, the adaptive array antenna reception result is transferred to a differential circuit 418. When the switch SWc 419 is connected to a decoding data side, the decoding result is transferred to the modulating circuit 420. The modulating circuit 420 modulates the unique word pattern of the synchronous burst. The differential circuit 418 subtracts the modulated result of the unique word pattern from the adaptive array antenna reception result, calculating an error between these results. The weighting factor controlling circuit 413 calculates a new weighting factor based on the error signal, the received signal from each antenna, and the weighting factor previously sampled, updating the weighting factor of the weighting factor controlling circuit 413.

At the unique word receiving time in receiving the communication channel, the weight factor using the unique word is not updated. In other word, all switches SWa 416, 417, and 419 are opened, and neither the modulating circuit 420 nor the differential circuit 418 operates. The weighting factor controlling circuit 413 does not operate either. Therefore, the weighting factor, which is updated by use of the unique word of the synchronous burst, is directly set to the complex multiplication circuit 413. In accordance with the weighting factor, the complex multiplying circuits 410, 411, 412 and the adding circuit 414 perform the adaptive array antenna reception. Then, the decoding circuit 415 decodes the adaptive array antenna reception result.

At the time other than the unique word receiving time in receiving the communication channel, the switch SWa 416 is closed, and the signals digitized by the A/D converters 404 to 409 are transferred to the weighting factor controlling circuit 413. In accordance with the weighting factor, the complex multiplying circuits 410, 411, 412 and the adding circuit 414 perform the adaptive array antenna reception. Then, the decoding circuit 415 decodes the adaptive array antenna reception result.

When the switch SWb 417 is closed, the adaptive array antenna reception result is transferred to a differential circuit 418. When the switch SWc 419 is connected to the decoding data side, the decoding result is transferred to the modulating circuit 420. The modulating circuit 420 modulates the unique word pattern of the synchronous burst. The differential circuit 418 subtracts the modulated result of the unique word pattern from the adaptive array antenna reception result, calculating an error between these results. The weighting factor controlling circuit 413 calculates a new weighting factor based on the error signal, the received signal from each antenna, and the weighting factor previously sampled, updating the weighting factor of the weighting factor controlling circuit 413.

Thus, the adaptive array antenna reception using the weighting factor calculated by the synchronous burst having the different unique word pattern so as to reproduce the signal of the message portion of the desired station, updating the weighting fact by use of the reproduced signal of the message portion. To accomplish such a purpose, the adaptive array antenna receiving apparatus of the second embodiment can update the weighting factor to extract the received signal from the desired station even if there is the interference station having the same unique word pattern as that of the desired station. As a result, the adaptive array antenna adaptive receiving apparatus can correctly extract only the received signal from the desired station even in the case where the propagation environment and the movement of the desired station are changed.

(Third Embodiment)

Figure 5:
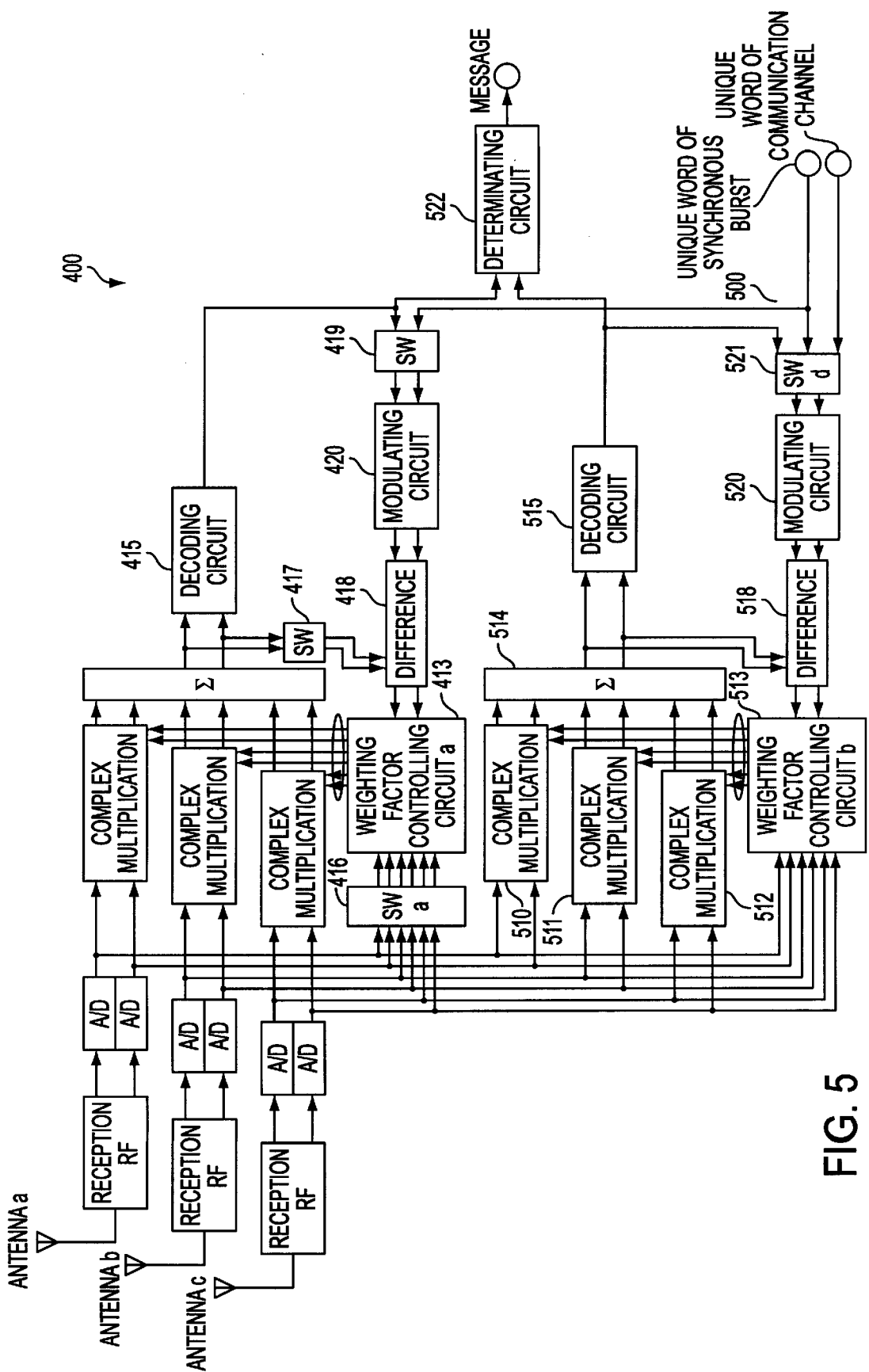
FIG. 5 is a block diagram showing an adaptive array antenna receiving apparatus according to a third embodiment of the present invention.

FIG. 5 is a block diagram showing an adaptive array antenna receiving apparatus of a third embodiment of the present invention. The second embodiment explained the method of following the change in the propagation environment and the movement of the desired station when the discrimination between the desired station and the interference station could not be made since the common unique word was used.

However, the interference station is not always present during the communication with the desired station. Also, in some cases, an error occurs in the message portion by influence of noise. For this reason, in the case where no interference station exists, the weighting factor may b e updated using only data of the unique word without using data of the message portion.

According to the third embodiment, in the communication channel having the same unique word pattern, there are provided means for updating the weighting factor using both the unique word and the message, and means for updating the weighting factor using only the message. Then, these means are selectively changed, depending on the receiving state.

A decision feedback typed active array antenna receiving circuit 400 shown in FIG. 4 closes the switch SWa 416 at the unique word receiving time of the synchronous burst and the message portion receiving time of the communication channel. Thereby, a received base band signal is send to a weighting factor controlling circuit a 413.

At the same time, the decision feedback typed active array antenna receiving circuit 400 closes the switch SWa 417, thereby sending the result of the active array antenna reception to the differential circuit 418. The switch SWc 419 selects the unique word of the synchronous burst at the unique word receiving time of the synchronous burst, and selects the message portion at the message portion receiving time of the synchronous burst and that of the message portion of the communication channel.

At this time, the modulating circuit 420 modulates the decoded result of the unique word of the synchronous burst or the decoded result of the message portions of the synchronous burst and the communication channel again. The differential circuit 418 subtracts the result obtained by the above modulation from the result of the adaptive array antenna reception, calculating an error between these results. The weighting factor controlling circuit a 413 calculates a new weighting factor based on the received band base signal, the error, and the weighting factor previously sampled, updating the weighting factor. At the same time, the message decoded by the decoding circuit 415 is output as a receiving signal.

At the unique word receiving time of the communication channel, the switches SWa 416, SWb 417, and SWc 419 are opened, and either the modulating circuit 420, the differential circuit 418, nor the weighting factor controlling circuit a 413 operates.

A conventional decision feedback typed adaptive array antenna receiving circuit 500 is also provided in parallel to the decision feedback typed adaptive array antenna receiving circuit 400.

At the unique word receiving time of the synchronous burst, a switch SWd 521 selects the unique word of the synchronous burst, and selects the unique word of the communication channel at the unique word receiving time of the communication channel. At each message receiving time, data of the message portion is selected.

Complex multiplying circuits 510, 511, 512 and an adding circuit 514 perform the adaptive array antenna reception. Then, a decoding circuit 515 decodes the received signal. A modulating circuit 520 modulates the decoded signal again. A differential circuit 518 subtracts the result obtained by the above modulation from the result of the adaptive array antenna reception, calculating an error between these results. A weighting factor controlling circuit b 513 calculates a new weighting factor based on the received band base signal, the error signal, and the weighting factor previously sampled, updating the weighting factor. At the same time, the decoded message is output as a receiving signal.

A determination circuit 522 determines a correct receiving signal. In the determination method, for example, when a CRC is added to the message, a CRC detection is provided to the outputs of both the conventional decision feedback type adaptive array antenna receiving circuit 500 and the receiving circuit of FIG. 4. Then, the output whose CRC detection was a proper value may be determined as a correct signal.

Thus, according to the adaptive array antenna receiving apparatus of the third embodiment, on one hand, it is assumed that the interference station having the same unique word pattern exists. Then, the decision feedback adaptive array antenna receiving circuit 400, which does not update the weighting factor using the unique word pattern, performs the signal reception. On the other hand, it is assumed that no interference station having the same unique word pattern exists. Then, the conventional decision feedback adaptive array antenna receiving circuit 500, which updates the weighting factor using the unique word pattern, performs the signal reception. Thereafter, the correct signal is selected based on the result of the CRC detection of the determination circuit 522.

As a result, only the signal received from the desired station can be extracted when the interference station exists. When no interference station exists, the performance of the adaptive array antenna reception can be improved. Moreover, regardless of the presence of the interference station, it is possible to follow the movement of the desired station and the change in the propagation environment.

(Fourth Embodiment)

Figure 6:
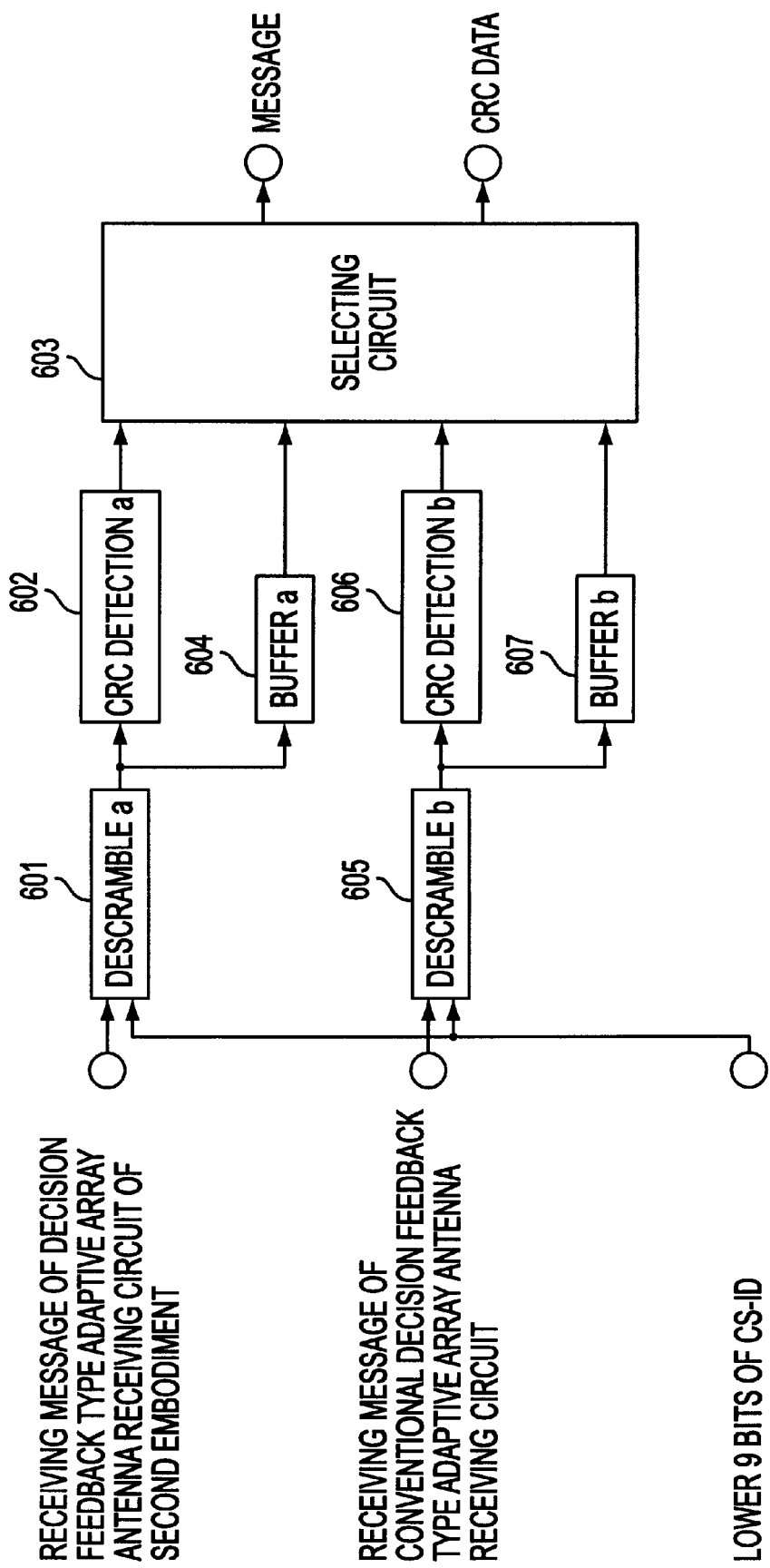
FIG. 6 is a block diagram showing an adaptive array antenna receiving apparatus according to a fourth embodiment of the present invention.
Figure 7:
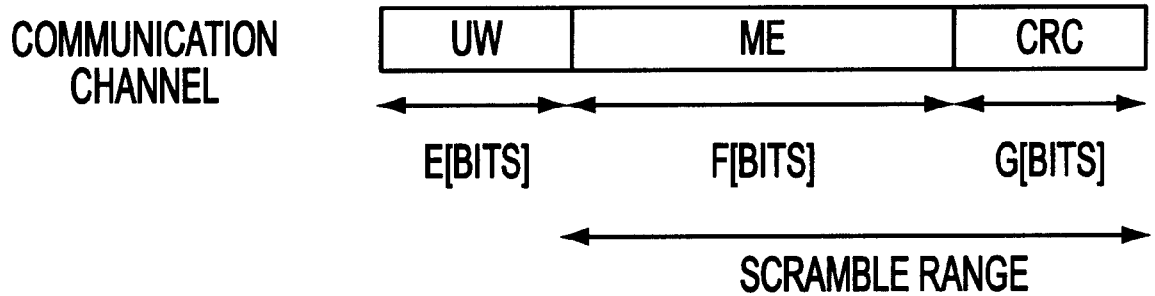
FIG. 7 is a view showing a frame format of receiving and transmitting signals according to the fourth embodiment of the present invention.

FIG. 6 is a block diagram showing an adaptive array antenna receiving apparatus of a fourth embodiment of the present invention. FIG. 7 shows a frame format of receiving and transmitting signals in the fourth embodiment of the present invention. The frame format for a communication channel for PHS is exemplified. To simplify the explanation, in FIG. 7, only the unique word, the message, and a CRC code, which were relevant to the present invention, were extracted from the frame format for PHS.

According to the fourth embodiment of the present invention, the determination circuit 522 of the third embodiment is used. The following will also explain the determination processing of selecting the output of the decision feedback typed adaptive array antenna receiving circuit 400 of the second embodiment and that of the conventional decision feedback typed adaptive array antenna receiving circuit 400.

In a PHS communication system, each terminal (PH) uses the common unique word at a communication channel (THC) transmission time. Each terminal uses lower nine bits of identification code (CS-ID) received from a base station at a communication starting time as an initial value for a scramble, and the scramble is added to the message. Then, it is checked with which base station each terminal communicates by the scramble.

In the base station, the receiving signal is descrambled by the lower nine bits of the identification number of the base station itself. Thereafter, the CRC check is performed so as to determine whether or not the received signal is the signal from the desired station. More specifically, a descrambler circuit a 601 descrambles both the message portion (ME) demodulated by the decision feedback typed adaptive array antenna receiving circuit of the second embodiment and the CRC portion by use of the lower nine bits of CS-ID as an initial value. A CRC detection circuit a 602 provides CRC detection to the result. The result of the CRC detection is sent to a selecting circuit 603. At the same time, the descrambled result is stored in a buffer a 604.

Similarly, a descrambling circuit b 605 descrambles both the message portion (ME) demodulated by the conventional decision feedback typed adaptive array antenna receiving circuit and the CRC portion by use of the lower nine bits of CS-ID as an initial value. A CRC detection circuit b 606 provides CRC detection to the result. The result of the CRC detection is sent to a selecting circuit 603. At the same time, the descrambled result is stored in a buffer b 607.

A selecting circuit 516 extracts either one of the received signals selected by the CRC detection from the buffer a 604 or the buffer b 607. When both received signals are passed through the CRC detection, the received signal may be extracted from either one of the buffer a 604 and the buffer b 607. When neither received signal is passed through the CRC detection, the received signal is not extracted from the buffer a 604 and the buffer b 607. Instead, data in which the received signals are not passed through the CRC detection is output.

Thus, according to the adaptive array antenna receiving apparatus of the fourth embodiment, on one hand, it is assumed that the interference station having the same unique word pattern exists. Then, the decision feedback adaptive array antenna receiving circuit, which does not update the weighting factor using the unique word pattern, performs the signal reception. On the other hand, it is assumed that no interference station having the same unique word pattern exists. Then, the conventional decision feedback adaptive array antenna receiving circuit 500, which updates the weighting factor using the unique word pattern, performs the signal reception. Thereafter, descrambling is performed based on the CS-ID, which can discriminate between the desired station and the interference station. Moreover, the correct signal is determined by the CRC detection.

As a result, only the signal received from the desired station can be extracted when the interference station exists. When no interference station exists, the performance of the adaptive array antenna reception can be improved. Moreover, even if there is the interference station, the adaptive array antenna reception can be appropriately performed in accordance with the movement of the desired station and the change in the propagation environment.

(Fifth Embodiment)

Figure 8:
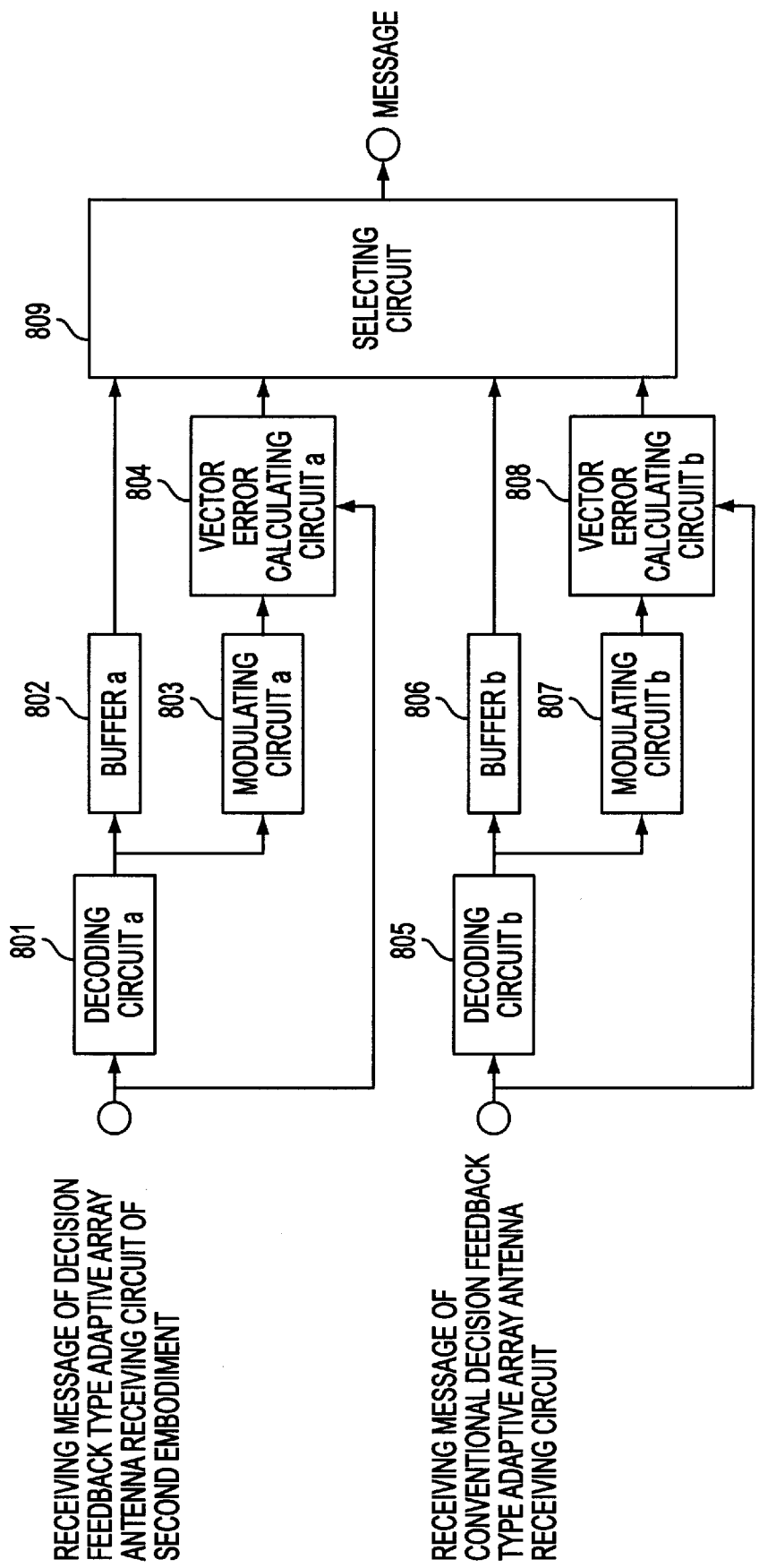
FIG. 8 is a block diagram showing an adaptive array antenna receiving apparatus according to a fifth embodiment of the present invention.

FIG. 8 shows a block diagram of an active array antenna receiving apparatus of the fifth embodiment of the present invention. According to the adaptive array antenna receiving apparatus of the fourth embodiment, the reliability of the result of the decision feedback typed adaptive array antenna receiving circuit 400 of the third embodiment was determined by the descrambling circuit a 601 and the CRC detection circuit a 602. The reliability of the result of the conventional decision feedback typed adaptive array antenna receiving circuit 500 was determined by the descrambling circuit b 605 and the CRC detection circuit b 606. Then, the selecting circuit 603 selected the suitable received signal.

According to the fifth embodiment, a vector error calculation circuit is used such that the suitable received signal is selected based on the value of the vector error.

A decoding circuit a 801 decodes the output of the decision feedback typed adaptive array antenna receiving circuit of the second embodiment, and stores the decoded result in a buffer a 802. A modulating circuit a 803 modulates the decoded result again, and a vector error calculation circuit a 804 calculates a vector error of the modulated signal.

Figure 9:
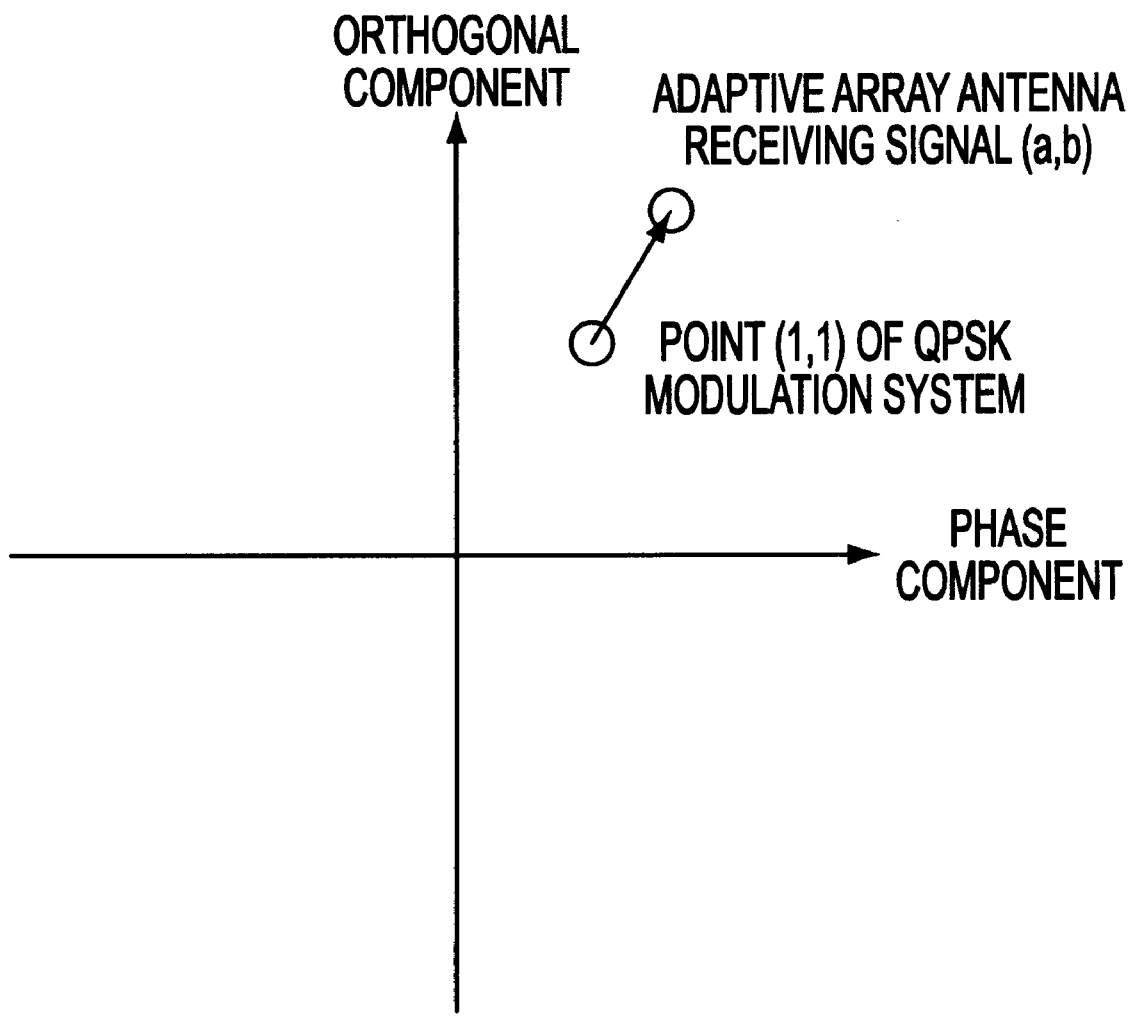
FIG. 9 is a view explaining an operation of the fifth embodiment of the present invention.

The vector error is shown in FIG. 9. More specifically, it is assumed that a signal point (1, 1) is obtained by modulating the result, which is decoded by the decoding circuit a 801 at time n, again by the modulating circuit a 803. Moreover, it is assumed that the output of the decision feedback adaptive array antenna receiving circuit 400 of the second embodiment is (a, b). In this case, the vector error can be calculated by the following equation (1):

$$v(n) = \sqrt{(a-1)^2 + (b-1)^2} \tag{1}$$

Generally speaking, it is assumed that a signal point $(rO_I(n), rO_Q(n))$ is obtained by modulating the result, which is decoded by the decoding circuit a 801, again by the modulating circuit a 803. Moreover, it is assumed that the output of the decision feedback adaptive array antenna receiving circuit 400 of the second embodiment is $(r_I(n), r_Q(n))$. In this case, the vector error can be calculated by the following equation (2)

$$v(n) = \sqrt{(r_I(n) - rO_I(n))^2 + (r_Q(n) - rO_Q(n))^2} \tag{2}$$

The vector error calculation circuit 804 calculates a vector error at time n based on equation (2), and adds vector errors for all symbols.

Similarly, a decoding circuit b 805 decodes an output of the conventional decision feedback adaptive array antenna receiving circuit 500. A buffer b 806 stores a decoded result. A modulating circuit b 807 modulates the result decoded by the decoding circuit b, again. A vector error calculation circuit b 808 calculates a vector error at time n based on equation (2), and adds vector errors for all symbols.

A selecting circuit 809 compares the vector error calculation result of the vector error calculation circuit a 804 with that of the vector error calculation circuit b 808. Then, the selecting circuit 809 selects a received signal from the buffer having a smaller vector error so as to be output.

Thus, according to the adaptive array antenna receiving apparatus of the fifth embodiment, on one hand, it is assumed that the interference station having the same unique word pattern exists. Then, the decision feedback adaptive array antenna receiving circuit, which does not update the weighting factor using the unique word pattern, performs the signal reception. On the other hand, it is assumed that no interference station having the same unique word pattern exists. Then, the conventional decision feedback adaptive array antenna receiving circuit, which updates the weighting factor using the unique word pattern, performs the signal reception. Thereafter, the suitable received signal is determined based on the decoded result of the message portion and the error of the adaptive array antenna reception result, and the output of either one of the circuits is selected.

As a result, only the signal received from the desired station can be extracted when the interference station exists. When no interference station exists, the performance of the adaptive array antenna reception can be improved. Moreover, regardless of the presence of the interference station, it is possible to follow the movement of the desired station and the change in the propagation environment. The received signal can be appropriately determined without using the CRC of the message, the other error detection codes, error correction codes.

(Sixth Embodiment)

Figure 10:
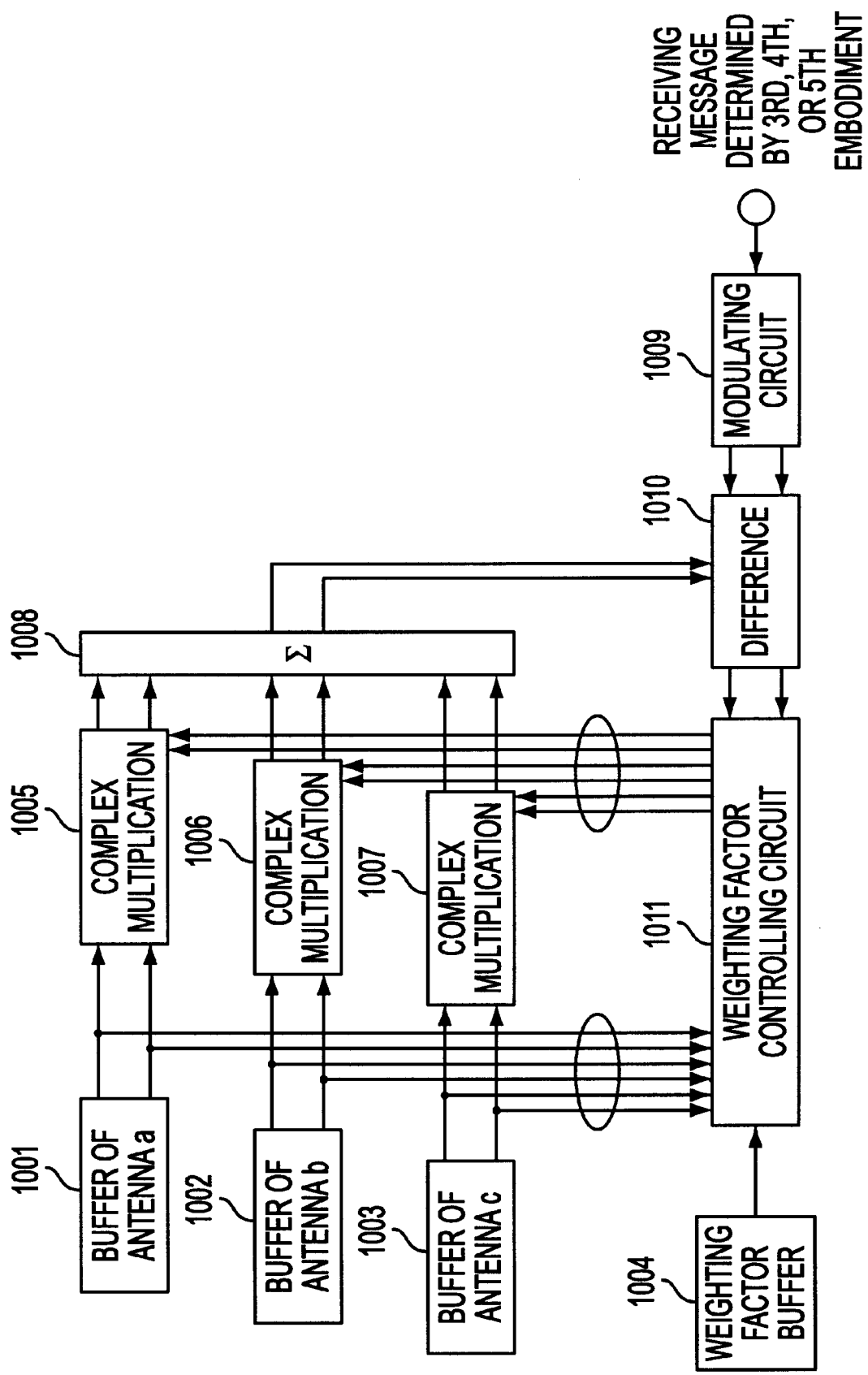
FIG. 10 is a block diagram showing an adaptive array antenna receiving apparatus according to a sixth embodiment of the present invention.

FIG. 10 shows a block diagram of an adaptive array antenna receiving apparatus of the sixth embodiment of the present invention. In the sixth embodiment, the modulating circuit and the differential circuit calculate an error based on the suitable received signal determined by the third embodiment, the fourth embodiment, or the fifth embodiment. Then, the weighting factor of the weighting factor controlling circuit is updated by the error signal.

A buffer 1001 of the antenna a stores the message portion of the received signal for one slot of the antenna. A buffer 1002 of the antenna b stores the message portion of the received signal for one slot of the antenna. A buffer 1003 of the antenna a stores the message portion of the received signal for one slot of the antenna.

A weighting factor buffer 1004 stores an initial value of the weighting factor of the corresponding slot. In other words, the weight factor set in the weighting factor controlling circuit of either one of the decision feedback typed adaptive array antenna receiving circuits 400 and 500 selected by the determination circuit is stored as an initial value.

Complex multiplying circuits 1005 to 1007 and an adding circuit 1008 perform the adaptive array antenna reception. A modulating circuit 1009 modulates the received message, which is determined by any one of the methods of the third to fifth embodiments, again. A differential circuit 1010 subtracts the modulated result from the adaptive array antenna reception result, thereby calculating the error.

At the first symbol, a weighting factor controlling circuit 1011 updates the weighting factor based on the initial value of the corresponding slot stored in the weighting factor buffer 1004, the base band signal of each antenna, and the error signal output of the differential circuit 1010. At the second symbol, et seq., the weighting factor controlling circuit 1011 updates the weight factor based on the weighting factor of the previous symbol, the received based band signal of each antenna, and the error signal output.

The updated weighting factor is stored in the weighting factor buffer 1004, and set as an initial value of the weighting factor controlling means 1011.

Thus, according to the adaptive array antenna receiving apparatus of the sixth embodiment, on one hand, it is assumed that the interference station having the same unique word pattern exists. Then, the decision feedback adaptive array antenna receiving circuit, which does not update the weighting factor using the unique word pattern, performs the signal reception. On the other hand, it is assumed that no interference station having the same unique word pattern exists. Then, the conventional decision feedback adaptive array antenna receiving circuit, which updates the weighting factor using the unique word pattern, performs the signal reception. Thereafter, the weight factor is updated based on either one of the suitable received signals.

As a result, regardless of the presence of the interference station, the weight factor can be updated based on the suitable received signal. Moreover, the suitable weighting factor can be used as an initial value at the next slot.

(Seventh Embodiment)

Figure 11:
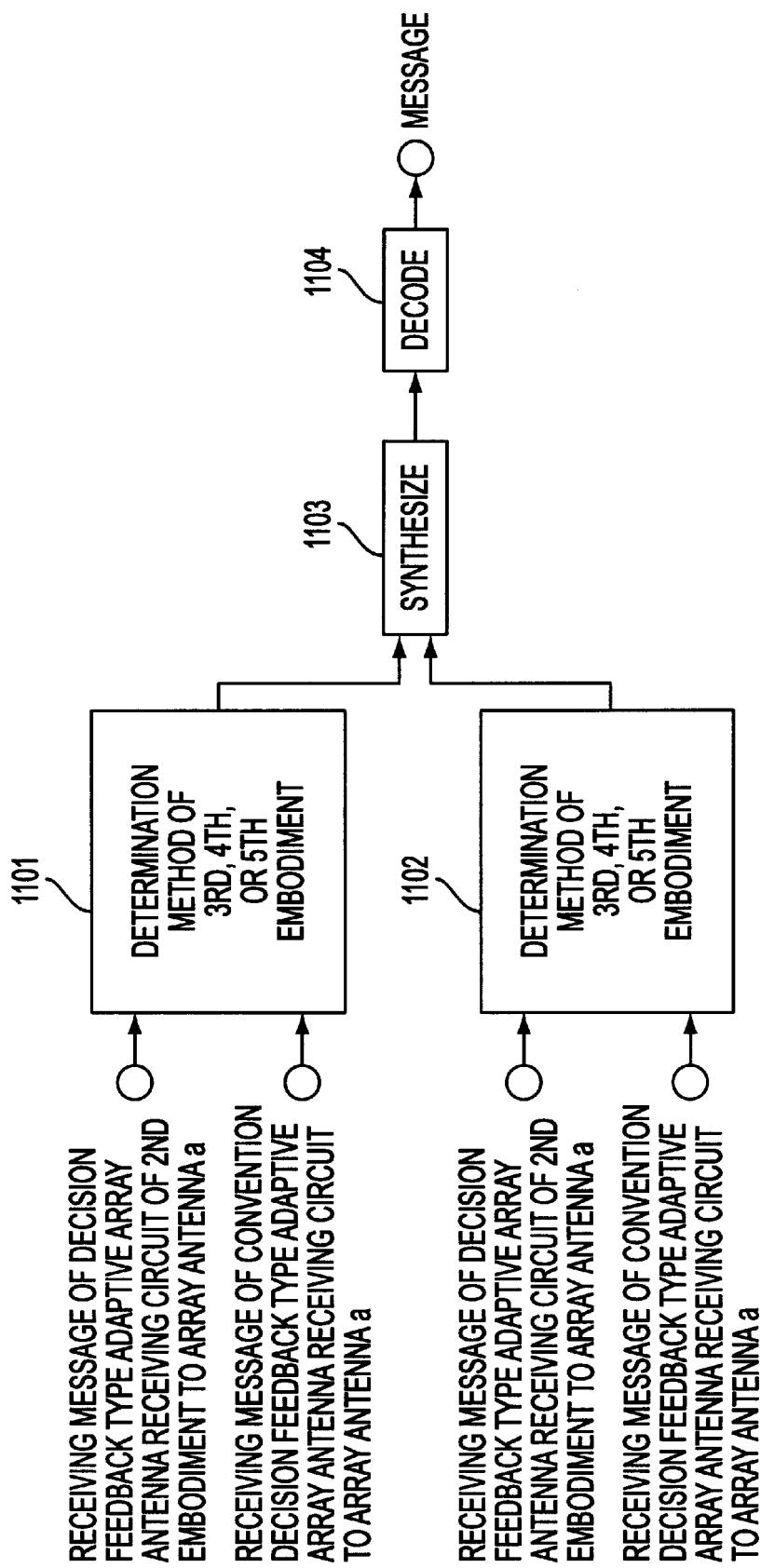
FIG. 11 is a block diagram showing an adaptive array antenna receiving apparatus according to a seventh embodiment of the present invention.

FIG. 11 shows a block diagram of an adaptive array antenna receiving apparatus of the seventh embodiment. In the first to sixth embodiments, one pair of array antennas was used to perform the adaptive array antenna reception. In the seventh embodiment, a plurality of array antennas is used to perform the adaptive array antenna reception. Moreover, determination circuits 1101 and 1102 select suitable received signals from the respective adaptive array antenna reception results. A synthesizing circuit 1103 synthesizes the reception results of the array antennas, and a decoding circuit 1104 decodes the synthesized signal.

The determination circuit 1101 selects a suitable received signal from either one of the receiving message to the array antenna a of the circuit 400 and the receiving message to the array antenna a of the circuit 500 by any one of the methods of the third to fifth embodiments.

The determination circuit 1102 selects a suitable received signal from either one of the receiving message to the array antenna b of the circuit 400 and the receiving message to the array antenna b of the circuit 500 by any one of the methods of the third to fifth embodiments.

The synthesizing circuit 1103 synthesizes the reception result of the array antenna a, and that of the array antenna b. The decoding circuit 1104 decodes the synthesized signal.

As a synthesizing method using the synthesizing circuit 1103, there are used an equal gain synthesis and a maximum ratio synthesis. In the equal gain synthesis, the phase of the array antenna a and that of the array antenna b are adjusted to each other, thereafter adding the reception results. In the maximum ratio synthesis, the phase of the array antenna a and that of the array antenna b are adjusted to each other, thereafter weighting the reception results by the size of an envelope and adding them.

Since the outputs of the array antennas adjust to a desired signal in their phase, an effect as an equal gain synthesis can be obtained by simply adding them. Also, an effect as a maximum ratio synthesis can be obtained by only weighting the outputs by the envelope and adding them.

Thus, according to the adaptive array antenna receiving apparatus of the seventh embodiment, on one hand, it is assumed that the interference station having the same unique word pattern exists. Then, the decision feedback adaptive array antenna receiving circuit, which does not update the weighting factor using the unique word pattern, performs the signal reception. On the other hand, it is assumed that no interference station having the same unique word pattern exists. Then, the conventional decision feedback adaptive array antenna receiving circuit, which updates the weighting factor using the unique word pattern, performs the signal reception. By selecting either one of the signal receptions, the suitable received signal can be obtained. Since the signal reception is performed by the plurality of array antennas, there can be avoided S/N deterioration caused by the continuous drop of the received signal even if a phasing frequency is slow.

(Eighth Embodiment)

Figure 12:
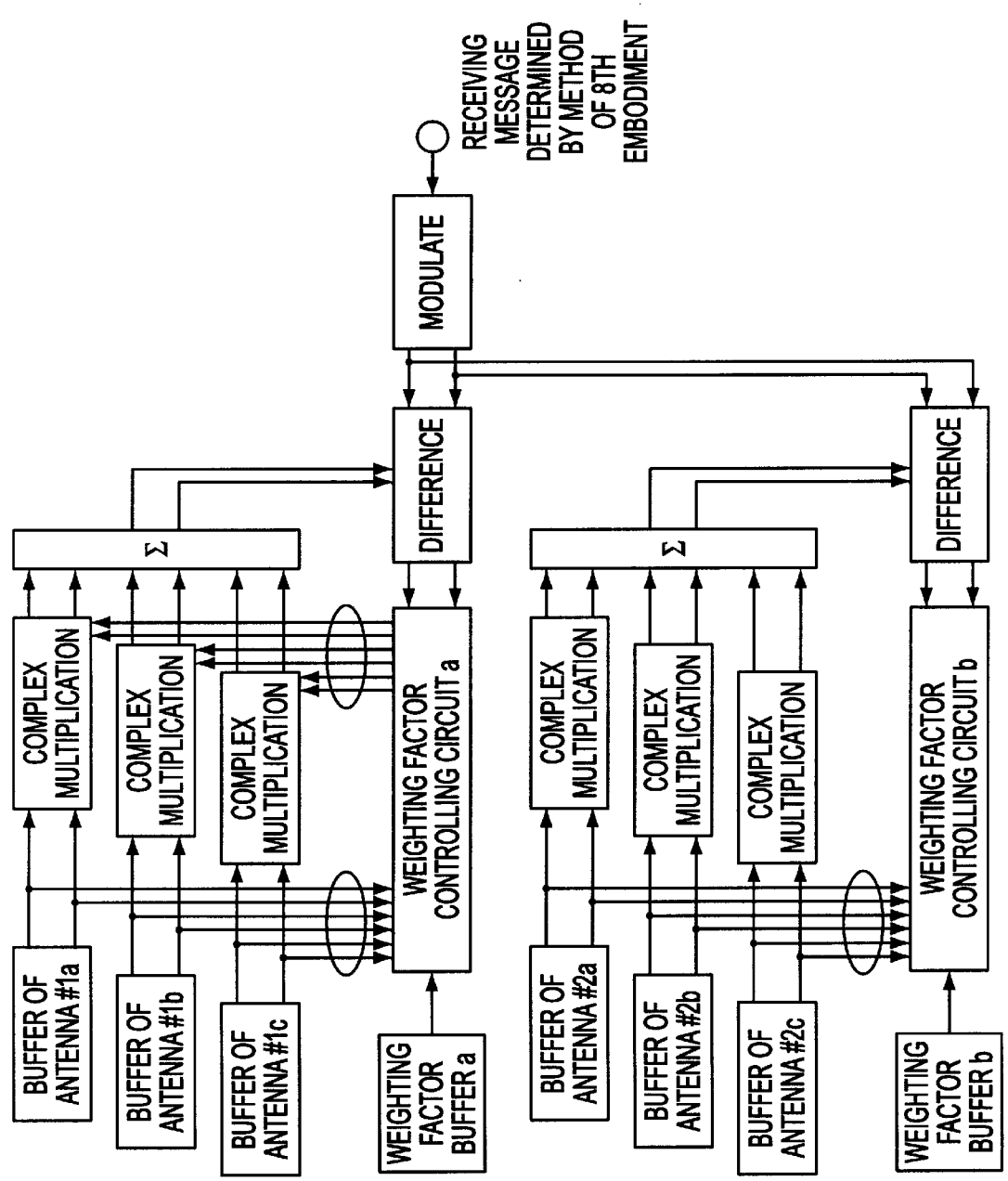
FIG. 12 is a block diagram showing an adaptive array antenna receiving apparatus according to an eighth embodiment of the present invention.
Figure 13:
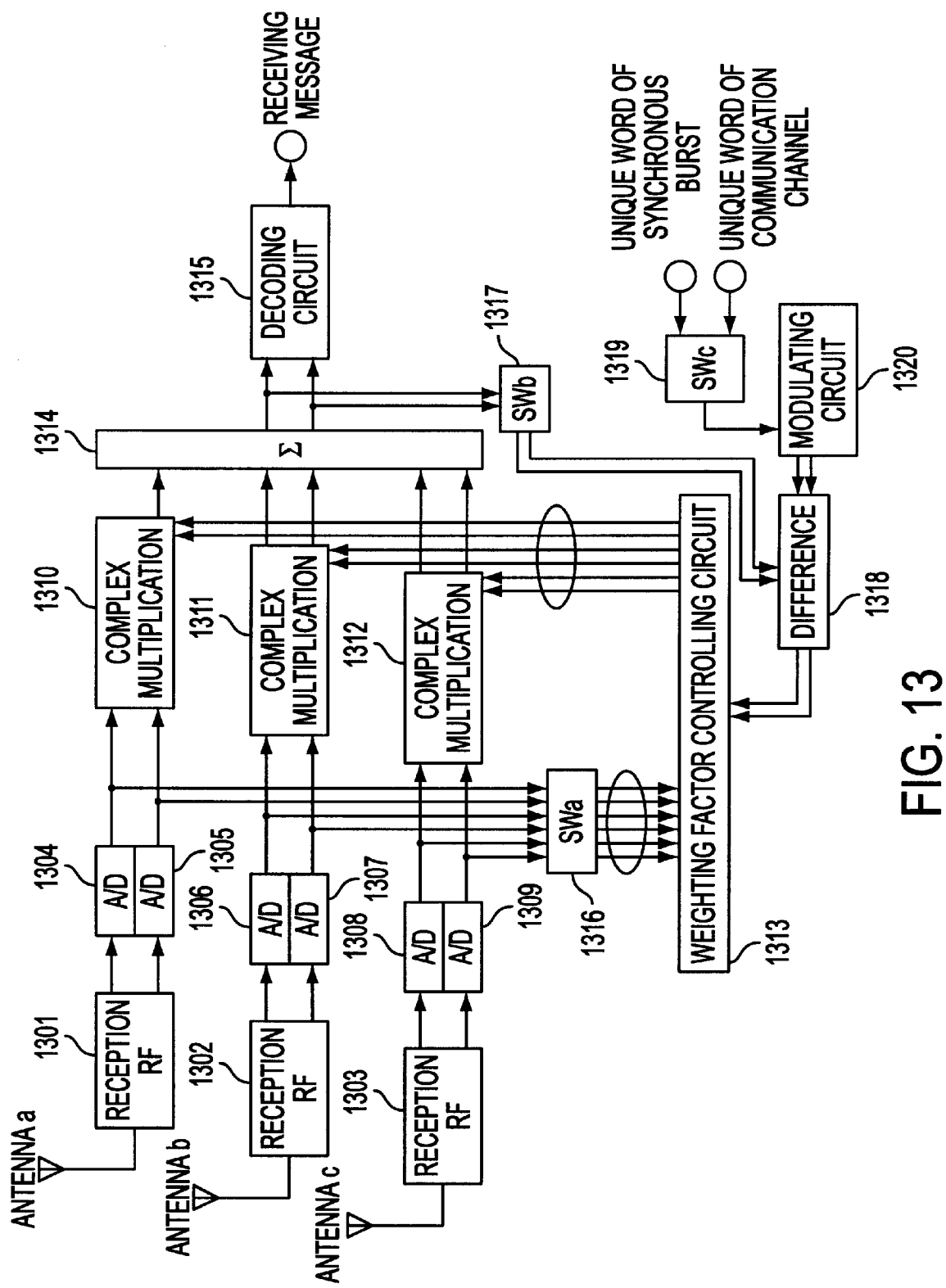
FIG. 13 is a block diagram showing a conventional adaptive array antenna receiving apparatus.
Figure 14:
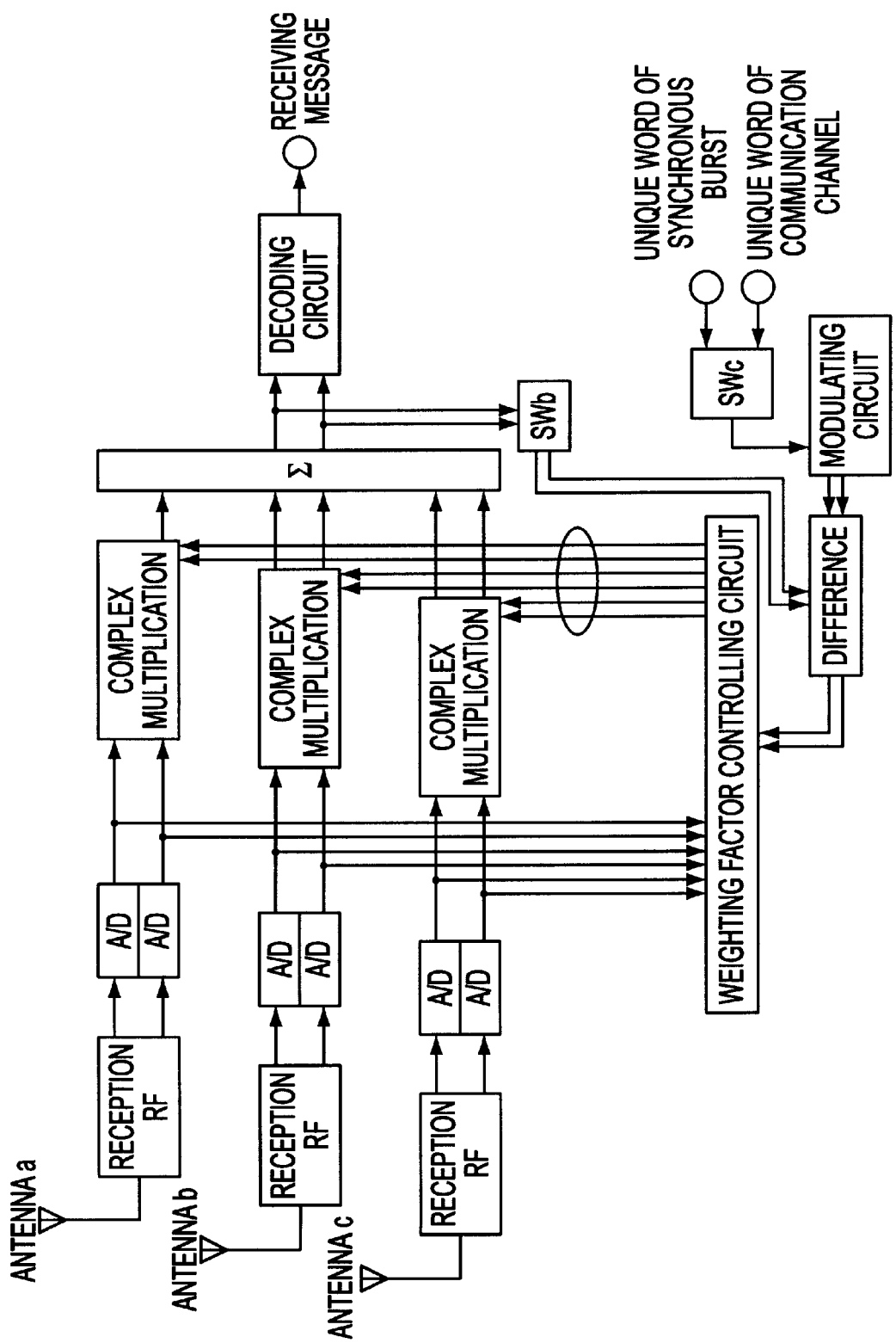
FIG. 14 is a block diagram showing another conventional adaptive array antenna receiving apparatus.
Figure 15:
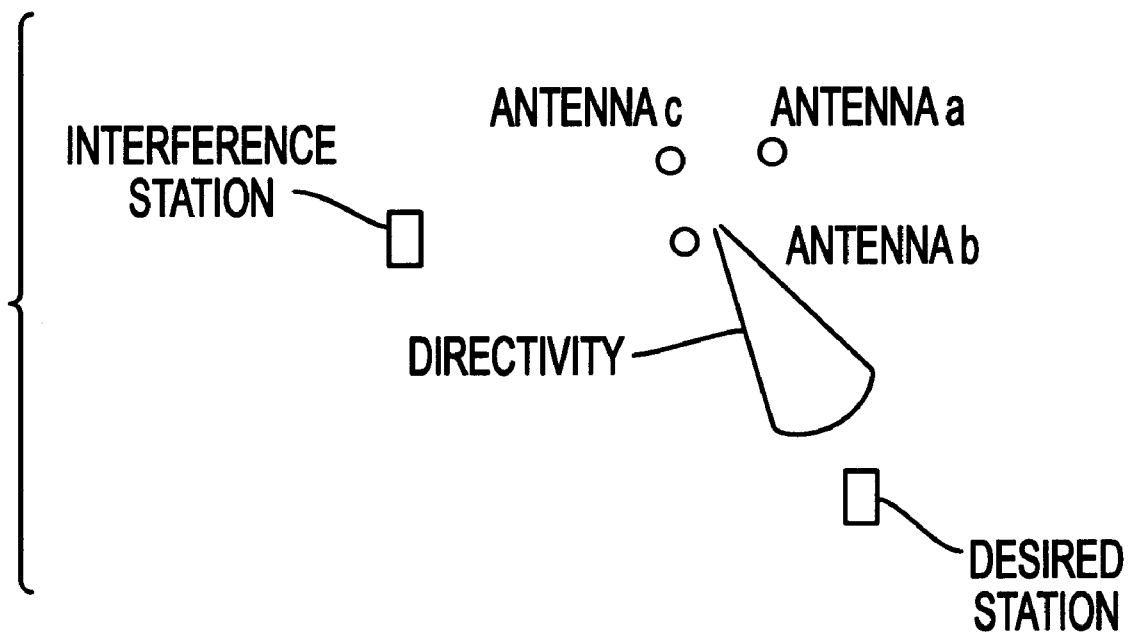
FIG. 15 is a view explaining a proper transmission directivity of the adaptive array antenna.
Figure 16:
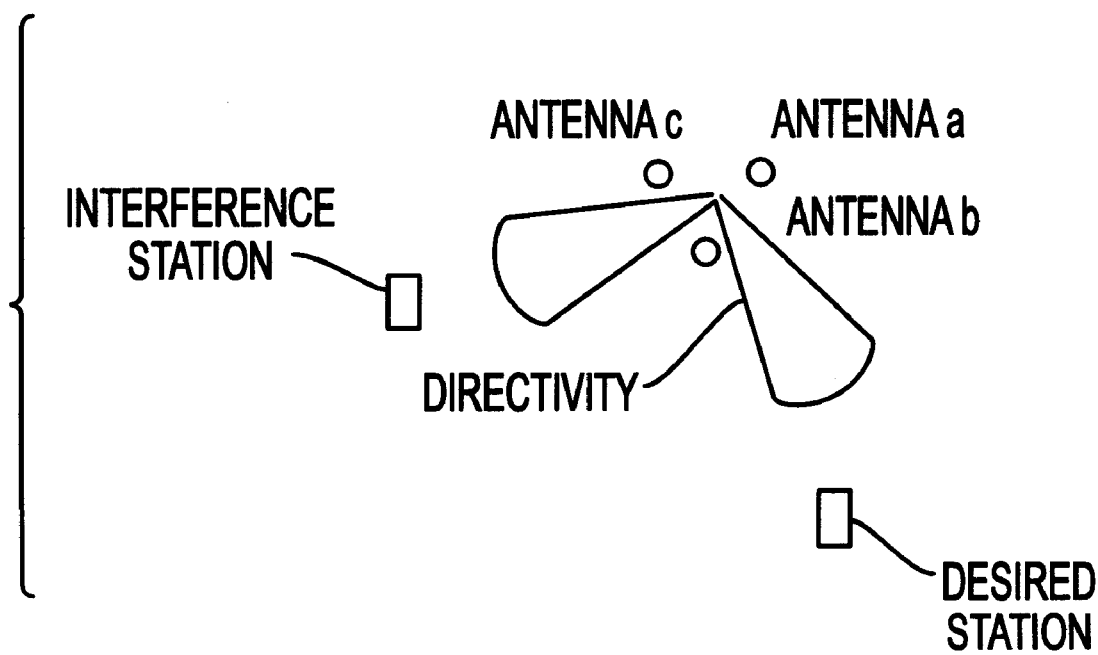
FIG. 16 is a view explaining an improper transmission directivity of the adaptive array antenna.

FIG. 12 shows a block diagram of an adaptive array antenna receiving apparatus of an eighth embodiment. In the eighth embodiment, the adaptive array antenna reception is performed by a plurality of adaptive array antenna receiving apparatus. A suitable received signal is selected from the respective adaptive array antenna reception results. The synthesizing circuit synthesizes the adaptive array antenna reception results of the plurality of the array, and the decoding circuit decodes the synthesized result. Then, the weighting factor of the weighting factor controlling circuit is updated based on the decoded result. The selection of the suitable received signal is performed by use of the determination method described in the third to fifth embodiments.

The method of updating the weighting factor for each array antenna is as explained in the sixth embodiment.

Regarding the array antenna a, the updated weighting factor is set as an initial value of the weighting factor of the weighting factor controlling circuits in two adaptive array antenna receiving apparatus 400 and 500 of the seventh embodiment. Similarly, regarding the array antenna b, the initial value of the weighting factor is set.

Thus, according to the adaptive array antenna receiving apparatus of the seventh embodiment, on one hand, it is assumed that the interference station having the same unique word pattern exists. Then, the decision feedback adaptive array antenna receiving circuit, which does not update the weighting factor using the unique word pattern, performs the signal reception. On the other hand, it is assumed that no interference station having the same unique word pattern exists. Then, the conventional decision feedback adaptive array antenna receiving circuit, which updates the weighting factor using the unique word pattern, performs the signal reception. Thereafter, the weighting factor is updated based on either one of the suitable received signals.

As a result, regardless of the presence of the interference station, the weighting factor can be updated based on the suitable received signal. Also, since the signal reception is performed by the plurality of array antennas, there can be avoided S/N deterioration caused by the continuous drop of the received signal even if a phasing frequency is slow. Moreover, the suitable weighting factor can be used as an initial value of the weighting factor of the next slot for each array antenna.

What is claimed is:

1. An adaptive array antenna receiving apparatus comprising:

Plural complex multiplying means for multiplying a receiving signal by a complex weighting factor;

adding means for adding an output signal of each complex multiplying means;

modulating means for modulating a known symbol;

differential outputting means for calculating a difference between the output of said adding means and that of said modulating means; and weighting factor calculating means for calculating a complex weighting factor from said receiving signal and the output of said differential output means only when a known signal pattern of a desired station is different from that of an interference station.

2. The apparatus according to claim 1, wherein said weighting factor calculating means updates the complex weighting factor using a receiving signal of a message portion without updating the complex weighting factor of the known signal pattern when the known signal pattern of the desired station is the same as that of the interference station after once calculating the complex weighting factor.

3. The apparatus according to claim 2, further comprising second weighting factor calculating means for updating the complex weighting factor using both the known signal patterns of the desired station and the interference station and the receiving signal of the message portion; and selecting means for selectively changing the output of said weighting factor calculating means and that of said second weighting factor calculating means.

4. The apparatus according to claim 3, wherein said selecting means comprises CRC detection means for providing a CRC detection, and said selecting means selects a correct CRC detection result.

5. The apparatus according to claim 3, wherein said selecting means comprises CRC detection means for providing a CRC detection, and descrambling means for releasing a scramble, and said selecting means selects a correct CRC detection result after releasing the scramble.

6. The apparatus according to claim 3, wherein said selecting means comprises decoding means for decoding the receiving signal, modulating means for modulating a decoded result, and vector error calculating means for calculating a difference between the receiving signal and the output of said modulating means, and said selecting means selects a smaller vector error.

7. The apparatus according to claim 3, wherein said weighting factor calculating means uses a decoded result as a reference signal, and updates the complex weighting factor.

8. The apparatus according to claim 3, wherein said weighting factor calculating means uses a decoded result as a reference signal, and updates only the complex weighting factor of either one of the weighting factor calculating means selected by said selecting means.

9. An adaptive array antenna receiving apparatus comprising a plurality of pairs of the adaptive array antenna receiving apparatus of claim 3; and synthesizing means for synthesizing received output results of these apparatus.

10. The apparatus according to claim 9, wherein said synthesizing means adds all outputs of said plurality of pairs of the adaptive array antenna receiving apparatus.

11. The apparatus according to claim 10, wherein said synthesizing means weights the outputs of said plurality of pairs of the adaptive array antenna receiving apparatus by an envelope of the outputs of the adaptive array antennas, and adds these outputs.

12. The apparatus according to claim 9, wherein said weighting factor calculating means uses a decoded result of a signal, which is complex multiplied using a complex weighting factor of the selected weighting factor calculating means, as a reference signal, and said weighting factor calculating means updates the complex weighting factor of the weighting factor calculating means of each of the plurality of the adaptive array antenna receiving apparatus.

13. The apparatus according to claim 9, wherein said weighting factor calculating means uses a decoded result of a signal, which is complex multiplied using a complex weighting factor of the weighting factor calculating means selected by the selecting means, as a reference signal, and said weighting factor calculating means updates only the weighting factor of the selected complex weighting factor calculating means.

* * * * *